United States Patent
Niimi et al.

(10) Patent No.: US 8,693,999 B2
(45) Date of Patent: Apr. 8, 2014

(54) COMMUNICATION APPARATUS, MAINTENANCE SYSTEM, MAINTENANCE METHOD AND COMPUTER PROGRAM

(75) Inventors: Masahiro Niimi, Takamatsu (JP); Masahiko Yano, Takamatsu (JP)

(73) Assignee: Fujitsu Limited, Kawasaki (JP)

( * ) Notice: Subject to any disclaimer, the term of this patent is extended or adjusted under 35 U.S.C. 154(b) by 1084 days.

(21) Appl. No.: 12/236,096

(22) Filed: Sep. 23, 2008

(65) Prior Publication Data

US 2009/0088149 A1 Apr. 2, 2009

(30) Foreign Application Priority Data

Sep. 28, 2007 (JP) ................................. 2007-256107

(51) Int. Cl.
*H04W 24/00* (2009.01)

(52) U.S. Cl.
USPC ........ 455/425; 455/423; 455/424; 455/456.1; 709/220; 709/223

(58) Field of Classification Search
USPC ................ 455/423–425, 456.1; 709/220, 223
See application file for complete search history.

(56) References Cited

U.S. PATENT DOCUMENTS

| 7,007,077 | B1 * | 2/2006 | Shinohara et al. | 709/220 |
| 2001/0056336 | A1 * | 12/2001 | Suzuki et al. | 702/188 |
| 2003/0022666 | A1 * | 1/2003 | Sato | 455/423 |
| 2004/0033799 | A1 * | 2/2004 | Fontius | 455/423 |
| 2004/0214566 | A1 * | 10/2004 | Suzuki et al. | 455/423 |
| 2006/0211415 | A1 * | 9/2006 | Cassett et al. | 455/423 |

FOREIGN PATENT DOCUMENTS

| JP | 2002-169705 | 6/2002 |
| JP | 2003-23677 | 1/2003 |
| JP | 2003-149028 | 5/2003 |
| JP | 2004-220460 | 8/2004 |
| JP | 2006-106857 | 4/2006 |
| JP | 2007-213434 | 8/2007 |

OTHER PUBLICATIONS

Japanese Office Action for application No. 2007-256107 issued Sep. 25, 2012.
Office Action from Japanese Application No. 2007-256107 issued Mar. 27, 2012.
Japanese Office Action issued Feb. 12, 2013 for corresponding Japanese Application No. 2007-256107.

* cited by examiner

*Primary Examiner* — Amancio Gonzalez
(74) *Attorney, Agent, or Firm* — Staas & Halsey LLP

(57) ABSTRACT

A communication apparatus for receiving maintenance data required for maintaining a device to be maintained and supplying maintenance data to the device to be maintained, and method are provided. The communication apparatus includes an acquisition unit for acquiring identification information for identifying the device and a sending unit for sending identification information acquired by the acquisition unit. The apparatus includes a receiving unit for receiving maintenance data including the identification information sent by the sending unit and a supply unit for supplying said maintenance data received by said receiving unit to said device to be maintained.

9 Claims, 10 Drawing Sheets

FIG. 3

| IDENTIFICATION DATA | DEVICE DATA | | | | MAINTENANCE INFORMATION DATA | |
|---|---|---|---|---|---|---|
| | KIND | NAME | MANUFACTURER'S SERIAL NUMBER | INSTALLED SITE | PROCESSING PROGRAM | UPDATE PROGRAM |
| 12345678 | Cadsfa | Tokure | 12413312 | 000B1308 | 0000A234 | — |
| 21987654 | Iaerakj | Area | 09090112 | — | 0000B831 | — |
| 12897654 | Akjlkp | werw | 12313124 | 000A1289 | 00001921 | 0000AD11 |
| ... | ... | ... | ... | ... | ... | ... |

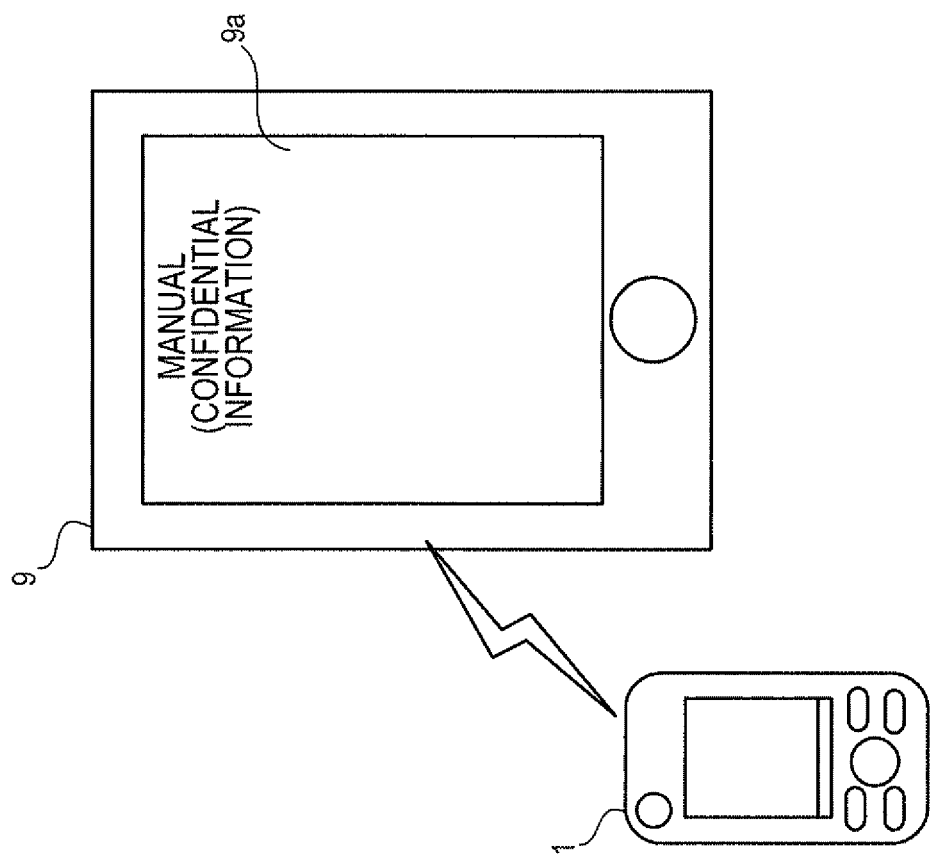

COMMUNICATION APPARATUS, MAINTENANCE SYSTEM, MAINTENANCE METHOD AND COMPUTER PROGRAM

CROSS-REFERENCE TO RELATED APPLICATIONS

This application is related to and claims priority to Japanese Patent Application having serial number 2007-256107, filed Sep. 28, 2007 and incorporated by reference herein.

BACKGROUND

1. Field

The embodiments discussed herein are directed to a communication apparatus, a maintenance system, a maintenance method and a computer program that can perform a maintenance operation for a device by supplying maintenance data.

2. Description of the Related Art

If a fault such as a failure or malfunction in a device in a computer system, directly coupled with a business activity causes a system to have problems, rapid recovery of the computer system is required.

Therefore, various maintenance systems that can shorten a time required for maintenance operation have been proposed.

For example, conventionally a maintenance system remotely operating a device to be maintained via a portable telephone from a maintenance apparatus by connecting the portable telephone to each of the maintenance apparatus and the device to be maintained has been discussed.

Thereby, the maintenance person can gain access to the device to be maintained from the maintenance apparatus at a remote site without going to the installed site of the device, and can promptly handle a request.

However, since outside access can be often refused or restricted for security reasons, it is difficult to perform a maintenance operation by remote operation in a maintenance system assuming the configuration is capable of making access from the outside.

Also, when a fault occurs requiring replacement of a board or units, for example, with maintenance that can not be performed from the remote site, it is required that a maintenance person go to the actual site.

In addition, when it is discovered that there is a need for incorporating a program into a replaced board or making e settings, there is a possibility that a maintenance person has not prepared the necessary data.

In such a case, the maintenance person needs to make another trip to the site n or contact another maintenance person, resulting in a problem that the maintenance operation is less efficient.

Also, when an operation of incorporating the program or making the version-up of the program is performed, for example, a human error may occur in which the unfamiliar maintenance person incorporate a different program by mistake to cause a malfunction.

SUMMARY

According to an aspect of an exemplary embodiment, identification information for identifying a device to be maintained is acquired, and the acquired identification information is sent to the outside (data providing apparatus).

The maintenance data including the sent identification information and required for maintenance of the device to be maintained may be received from the outside (data providing apparatus).

The received maintenance data is stored and the stored maintenance data is supplied to the device to be maintained connected to be able to make the data communication.

According to an aspect of an embodiment, the identification information includes an intrinsic identification number assigned to the device to be maintained, and the maintenance data including the identification number may be received from the outside (data providing apparatus).

According to an aspect of an embodiment, the identification information includes positional information at the installed site of the device to be maintained, and the maintenance data including the positional information may be received from the outside (data providing apparatus).

According to an aspect of an embodiment, the installed site of the device to be maintained is imaged and image data of the installed site is generated as positional information.

Maintenance data including the generated image data may be received from the outside (data providing apparatus).

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 illustrates an example of a management data table stored in a server apparatus;

FIG. 10 illustrates an example of using an electronic paper apparatus.

DETAILED DESCRIPTION OF THE EMBODIMENTS

Exemplary embodiments of the present invention are described below with reference to the drawings.

A maintenance system according to an embodiment may be employed when a fault occurs such as a malfunction or failure in a device such as a server, a modem or a router making up a network system constructed within the company, and the maintenance person goes to the installed site of each device to perform a maintenance operation, for example.

In the following explanation, the device for which the maintenance person performs the maintenance operation is referred to a "device to be maintained."

Figure 1:
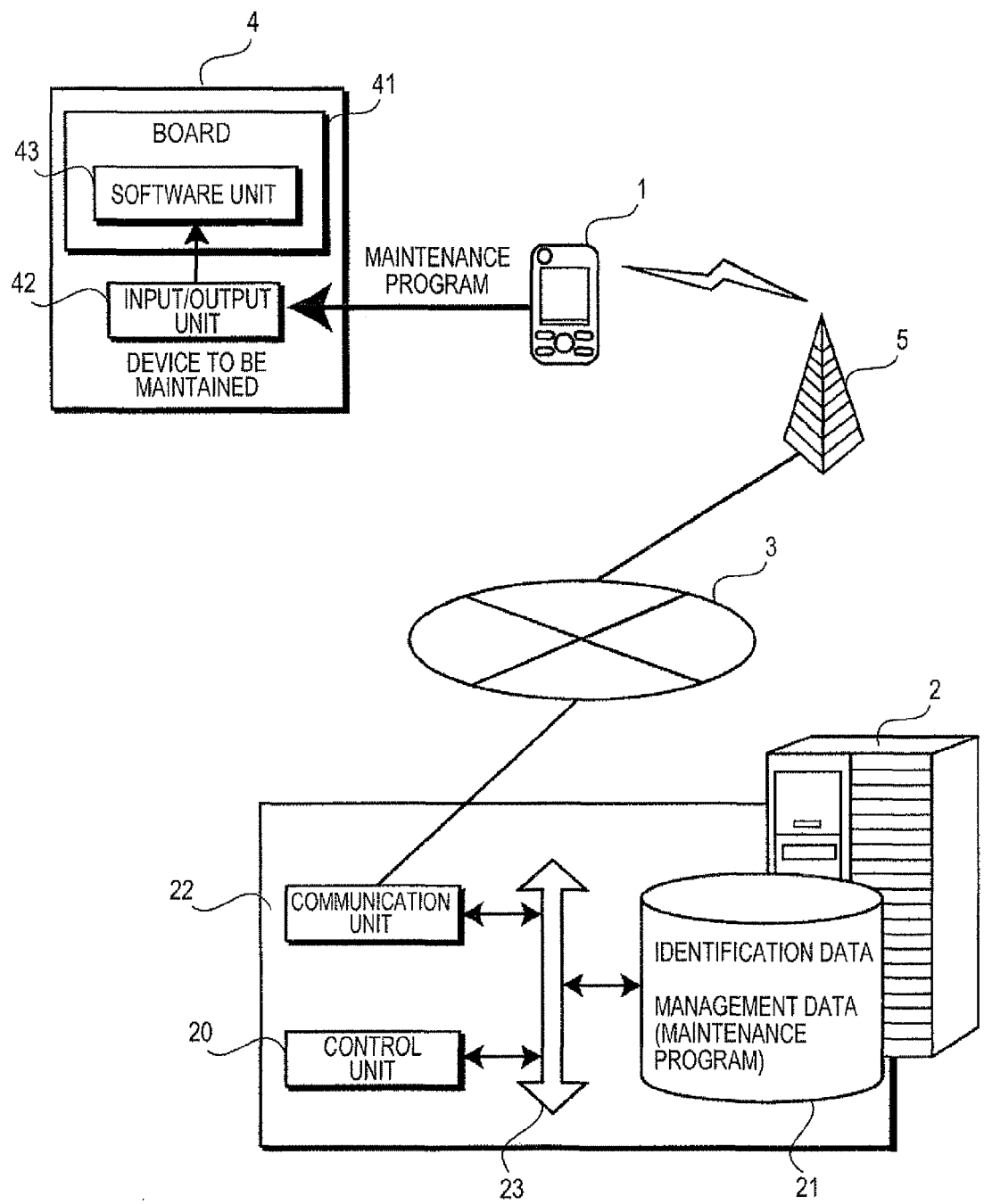
FIG. 1 illustrates a maintenance system according to an embodiment of the present invention.

FIG. 1 illustrates a maintenance system according to an embodiment of the invention.

The maintenance system of this embodiment includes a portable telephone 1 connected to a device to be maintained 4, and a server apparatus 2 that can transmit and receive data to and from the portable telephone 1 via a base station 5 and a communication line 3.

The communication line 3 may be the general telephone line or private line.

The base station 5 is a radio base station connected to the communication line 3 to transmit or receive electric wave to or from the moving portable telephone 1 via the communication line 3 and enable data communication or voice communication with the portable telephone 1.

An exemplary configuration of the device to be maintained 4 for performing the maintenance operation in the maintenance system will be described below.

The device to be maintained 4 includes a replaceable board 41 and an input/output unit 42.

The board 41 has a plurality of circuit elements incorporated, and the printed wiring to form an integrated circuit, for example.

The board 41 has a software unit 43, and may be operated by incorporating a processing program into the software unit 43.

The input/output unit 42 may be a USB (Universal Serial Bus) terminal, for example, and connected to the portable telephone 1 via a USB cable to enable the data communication with the portable telephone 1.

A maintenance program (maintenance data) may be supplied from the portable telephone 1 connected. This maintenance program may be incorporated via the input/output unit 42 into a software unit 43.

The maintenance program may be a processing program incorporated into the software unit 43 of the device to be maintained 4, or an update program for updating or modifying the processing program, and may be stored in the server apparatus 2 and supplied via the portable telephone 1 to the device to be maintained 4, as will be described later.

In this embodiment, it may be supposed that when a fault occurs in the board 41 of the device to be maintained 4, and the maintenance operation may be performed for the device to be maintained 4.

The maintenance operation refers to the operation of replacing the board 41 and incorporating the processing program into the software unit 43 of the new board 41, or the operation of incorporating the update program for updating or modifying the program of the software unit 43.

The configuration of the portable telephone 1 in the maintenance system will be described below.

Figure 2:
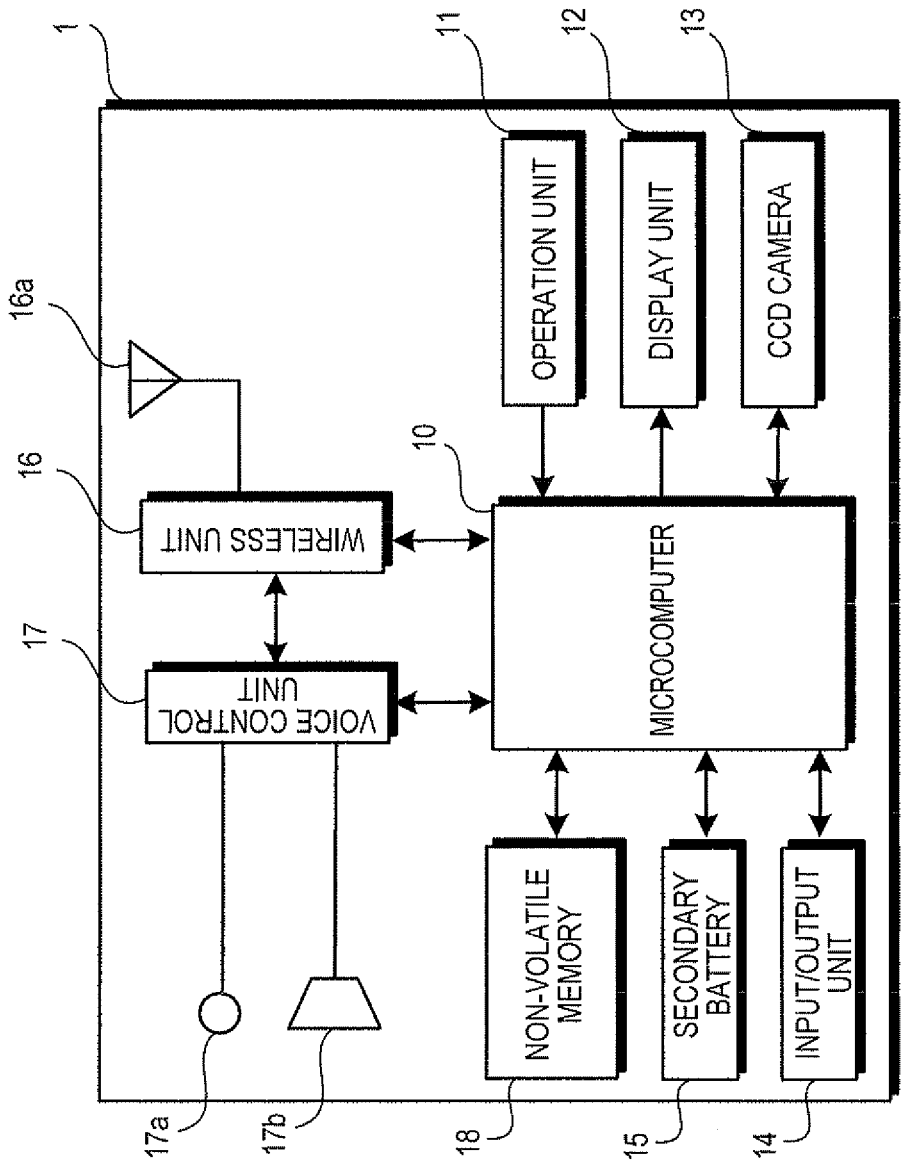
FIG. 2 illustrates the configuration of a portable telephone of FIG. 1.

FIG. 2 illustrates the configuration of the portable telephone 1 as shown in FIG. 1.

The portable telephone 1 may be a communication apparatus for registering device data of the device to be maintained 4 with the server apparatus 2, and receiving the maintenance program of the device to be maintained 4 from the server apparatus 2 in the maintenance operation.

The device data refers to data regarding the device to be maintained 4, such as the kind, name, manufacturers serial number and installed site of the device to be maintained 4.

The portable telephone 1 includes a microcomputer 10, an operation unit 11, a display unit 12, a CCD (Charge-Coupled Device) camera 13, an input/output unit 14, a secondary battery 15, a wireless unit 16, a voice control unit 17 and a non-volatile memory 18.

Figure 6:
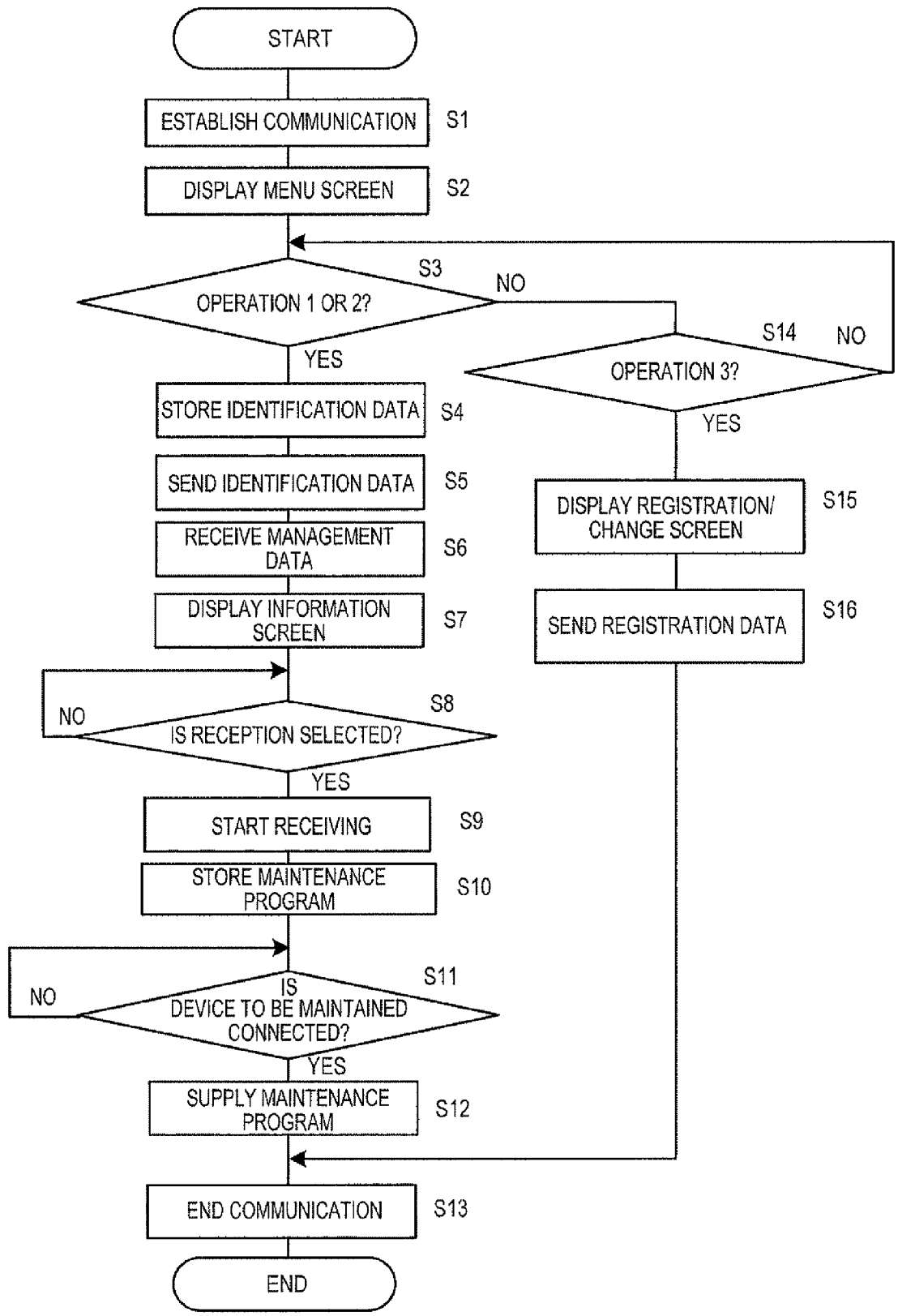
FIG. 6 illustrates a maintenance process performed by the portable telephone.

The microcomputer 10 includes a CPU (Central Processing Unit), not shown, a ROM (Read Only Memory) and a RAM (Random Access Memory), and controls each unit of the portable telephone 1 by performing a process as shown in FIG. 6 which will be described later.

The operation unit 11 has the input keys such as number or character to detect an operation on various kinds of input keys, and output it to the microcomputer 10.

The display unit 12 displays various kinds of image decided by the microcomputer 10.

The CCD camera 13 is an imaging unit for obtaining image data, and outputs the imaged result to the microcomputer 10.

The input/output unit 14, like the input/output unit 42 of the device to be maintained 4, may be a USB terminal, for example, for enabling connection with the device to be maintained 4 via the USB cable to output the maintenance program to the device to be maintained 4.

The input/output unit 14 detects the connection with the device to be maintained 4, when the device to be maintained 4 is connected.

The communication between the portable telephone 1 and the device to be maintained 4 may be made by wireless with infrared or other electric wave.

The secondary battery 15 is a power source for supplying power to the microcomputer 10, and enabling the operation of the portable telephone 1.

The wireless unit 16 transmits or receives electric wave to or from the base station 5 via an antenna 16a to modulate the transmitted electric wave or demodulate the received electric wave.

The data communication with the server apparatus 2 may be performed via the antenna 16a and the wireless unit 16.

The voice control unit 17 outputs a reception signal received by the wireless unit 16 from a speaker 17b, and converts a voice signal inputted from a microphone 17a into digital data and outputs it to the wireless unit 16.

The non-volatile memory 18 stores various kinds of data or program in non-volatile manner, including image data imaged by the CCD camera 13, data inputted from the operation unit 11, data received from the server apparatus 2, and an application program performed by the microcomputer 10.

The portable telephone 1 configured above can start the maintenance operation by executing a maintenance application program stored in the non-volatile memory 18 to acquire identification data specifying the device to be maintained 4, transmit the acquired identification data to the server apparatus 2 and receive the maintenance program of the device to be maintained 4.

The portable telephone 1 stores the received maintenance program in the non-volatile memory 187 and supplies it to the device to be maintained 4 connected to the input/output unit 14.

In this embodiment, the identification data refers to the serial number assigned to the device to be maintained 4.

This serial number may be directly inputted from the operation unit 11, or acquired by picking up an image such as a bar code or two-dimensional code in which the serial number may be encoded with the CCD camera 13 and analyzing the obtained image data.

The configuration of the server apparatus 2 in the maintenance system will be described below.

The server apparatus 2 is a data providing apparatus for storing device data of the device to be maintained 4 as management data together with the maintenance information data, and transmitting the maintenance program requested from the portable telephone 1 to the portable telephone 1.

The maintenance information data is the address indicating the storage destination of the maintenance program stored in the server apparatus 2.

The server apparatus 2 includes a control unit 20, a mass storage unit 21, and a communication unit 22, which are connected via a data bus 23, as shown in FIG. 1.

The control unit 20 includes a CPU, a ROM and a RAM, and performs a process as will be described later and shown in FIG. 7 in accordance with various kinds of command.

The communication unit 22 enables the data communication with the portable telephone 1 via the communication line 3 and the base station 5.

The mass storage unit 21 is a storage unit capable of reading or writing data with the control unit 20, and stores various kinds of data such as a data table as shown in FIG. 3 in a database format, for example.

FIG. 3 illustrates an example of a management data table stored in the server apparatus 2.

The management data table has set an identification data column, a device data column and a maintenance information data column.

The identification data column stores the serial number of the device to be maintained 4 registered from the portable telephone 1.

The device data column includes a kind column, a name column, a manufacturer's serial number column, and an installed site column of the device to be maintained 4.

The maintenance information data column includes a processing program column and an update program column.

Various kinds of data registered at the same time with the serial number may be stored associated with the serial number in each column.

The installed site column stored in the device data column stores the address of the area where the image is stored, when the image of the installed site of the device to be maintained 4 is registered.

The processing program column stores the address of the area where the processing program is stored, and the update program column stores the address of the area where the update program is stored.

With the data table of FIG. 3, the server apparatus 2 can transmit management data including the identification data received from the portable telephone 1 to the portable telephone 1.

An operation screen displayed on the display unit 12 of the portable telephone 1 in making the maintenance operation will be described below.

Figure 4A:
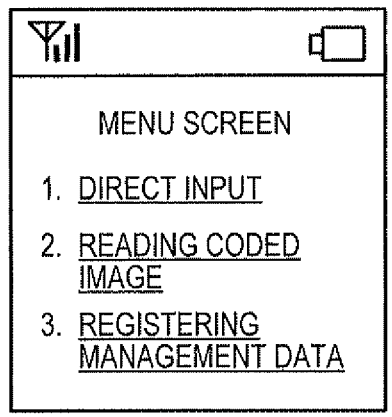
FIG. 4A illustrates an example of a menu screen displayed on the portable telephone.
Figure 4B:
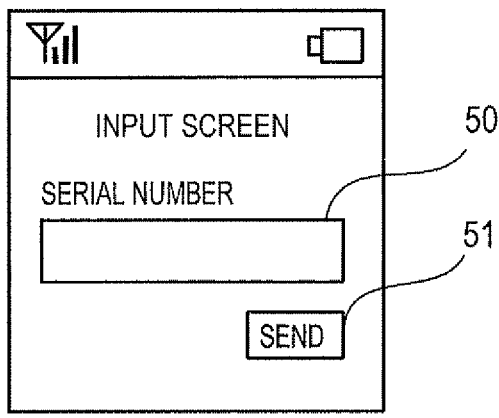
FIG. 4B illustrates an example of an input screen displayed on the portable telephone.

FIG. 4A illustrates an example of a menu screen displayed on the portable telephone 1, and FIG. 4B illustrates an example of an input screen displayed on the portable telephone 1.

Figure 4C:
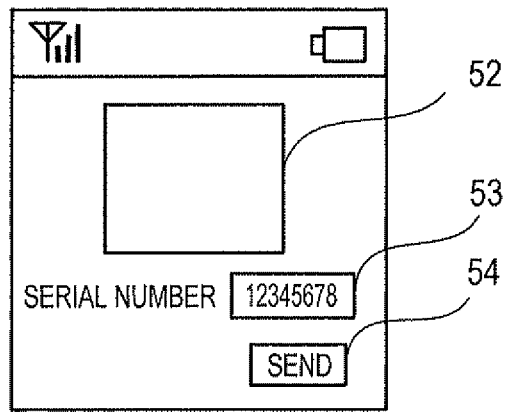
FIG. 4C illustrates an example of a read screen displayed on the portable telephone.

Also, FIG. 4C illustrates an example of a read screen displayed on the portable telephone 1.

Figure 5:
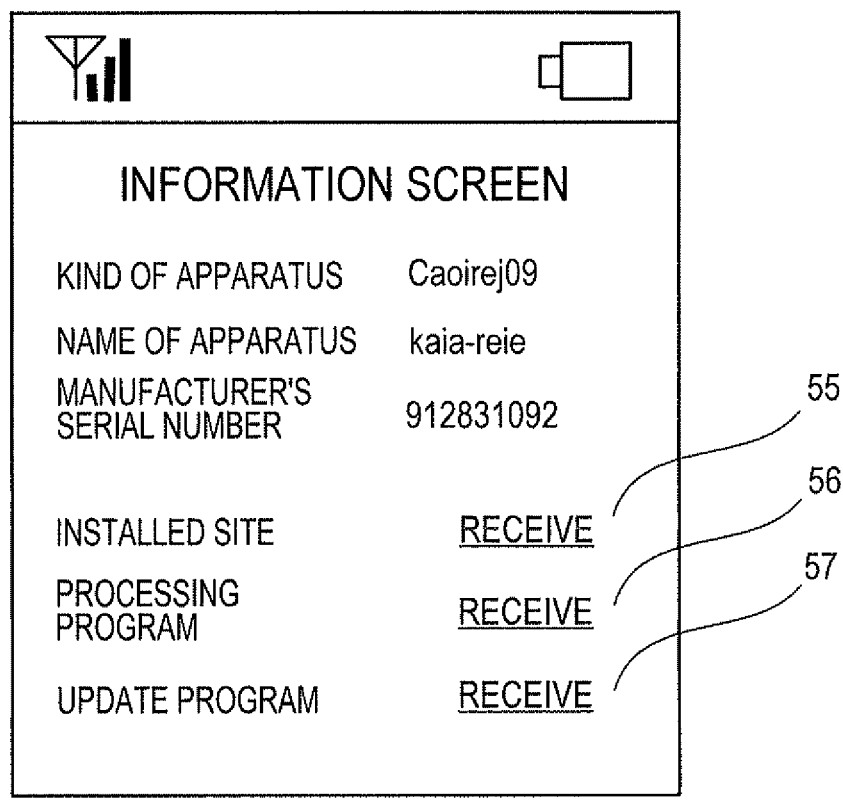
FIG. 5 illustrates an example of an information screen displayed on the portable telephone.

FIG. 5 illustrates an example of an information screen displayed on the portable telephone 1.

The menu screen as shown in FIG. 4A is an exemplary screen displayed in starting the maintenance operation by executing the maintenance application program to make a selection of transmitting the identification data of the device to be maintained 4 to the server apparatus 2 and receiving management data of the device to be maintained 4 or registering new management data with the server apparatus 2.

More specifically, an operation (hereinafter referred to as an operation 1) of directly inputting the serial number from the operation unit 11, an operation (hereinafter referred to as an operation 2) of inputting the serial number by picking up the encoded image of the serial number, or an operation (hereinafter referred to as an operation 3) of registering or changing management data of the device to be maintained 4 is selectable on the menu screen.

The operation 3 is selected when the management data of the device to be maintained 4 is not registered with the server apparatus 2, or when the management data registered with the server apparatus 2 is changed.

The input screen as shown in FIG. 4B is an exemplary screen displayed when the operation 1 is selected on the menu screen as shown in FIG. 4A.

A text box 50 for inputting the serial number with an input key on the operation unit 11 and a transmission button 51 for executing the transmission of the serial number inputted into the text box 50 to the server apparatus 2 are displayed on the input screen.

The read screen as shown in FIG. 4C is an exemplary screen displayed when the operation 2 is selected on the menu screen as shown in FIG. 4A.

An image box 52 for displaying the image picked up by the CCD camera 13, a display box 53 for displaying the serial number acquired by analyzing the image picked up by the CCD camera 13, and a transmission button 54 for executing the transmission of the acquired serial number to the server apparatus 2 are displayed on the read screen.

The information screen as shown in FIG. 5 is an exemplary screen when the management data may be received from the server apparatus 2.

The kind, name and manufacturer's serial number of the device to be maintained 4 including the transmitted serial number on the input screen as shown in FIG. 4B, or the read screen as shown in FIG. 4C are displayed on this information screen.

Also, a link 55 for starting receiving image data at the installed site of the device to be maintained 4, a link 56 for starting receiving the processing program incorporated into the device to be maintained 4 including the transmitted serial number, and a link 57 for starting receiving the update program of the device to be maintained 4 including the transmitted serial number are displayed on the information screen.

The link 55 for receiving the image and the link 57 for receiving the update program are not displayed when the image data of the installed site and the update program are not registered with the server apparatus 2.

In this way, because of the ability of confirming the image of the installed site, the maintenance person can confirm whether the device to be maintained 4 is the device for making the maintenance operation, reducing the human error.

Also, since the link 57 for receiving the update program is displayed, the maintenance person can be indirectly notified that it is necessary to update or modify the processing program.

Next, the operation of the portable telephone 1 and the server apparatus 2 making up the maintenance system and thereby the operation of the maintenance system will be described below.

Referring to FIG. 6, the operation of the portable telephone 1 will be firstly described below.

FIG. 6 illustrates a maintenance process performed by the portable telephone 1.

The microcomputer 10 of the portable telephone 1 starts a process of FIG. 6 by executing the maintenance application program stored in the non-volatile memory 18.

First of all, the microcomputer 10 establishes the communication with the server apparatus 2 (S1), and displays the menu screen of FIG. 4A on the display unit 12 (S2).

The microcomputer 10 determines whether or not the operation 1 or operation 2 is selected, that is, the operation of transmitting the identification data to the server apparatus 2 is selected on the menu screen (S3).

If the operation 1 or operation 2 is selected on the menu screen (S3: YES), the microcomputer 10 stores the identification data inputted by the method selected on the menu screen in the non-volatile memory 18 (S4).

For example, if the operation 1 is selected, the microcomputer 10 displays the input screen of FIG. 4B, and stores the serial number inputted on the input screen with an input key of the maintenance person on the operation unit 11.

If the operation 2 is selected, the microcomputer 10 displays the read screen of FIG. 4C and drives the CCD camera 13.

The image in which the serial number is encoded is picked up, the image data obtained as a result is analyzed (decoded), and the serial number displayed in the display box 53 on the read screen is stored.

Then, the microcomputer 10 waits until the transmission button 51 or 54 on the input screen or read screen is manipulated, and when manipulated, transmits the identification data (serial number) stored in the non-volatile memory 18 to the server apparatus 2 (S5).

The microcomputer 10 receives the management data including the transmitted identification data (S6), and displays the information screen as shown in FIG. 5, based on the received management data (S7).

Subsequently, the microcomputer 10 determines whether or not the receivable maintenance program displayed on the information screen is selected (S8).

That is, it is determined whether or not the link 56 for starting receiving the processing program or the link 57 for receiving the update program is selected on the information screen.

If the receivable maintenance program is not selected (S8: NO), the microcomputer 10 waits unit selected.

In this case, if the link 55 for receiving the image is selected, the microcomputer 10 receives the image data of the installed site from the server apparatus 2.

If the link is not selected even after the passage of a predetermined time the maintenance process may be ended, or the screen for prompting the maintenance person for selection may be displayed.

If the receivable maintenance program is selected (S8: YES), the microcomputer 10 starts receiving the selected maintenance program from the server apparatus 2 (S9).

For example, if the link 56 for starting receiving the processing program is selected on the information screen as shown in FIG. 5, a request signal for the processing program is transmitted to the server apparatus 2, and the processing program may be received, for example, packet by packet, from the server apparatus 2.

Accordingly, only by transmitting the identification data of the device to be maintained 4 from the portable telephone 1 to the server apparatus 2, the maintenance person who performs the maintenance operation can acquire the maintenance program required for the maintenance operation while residing at a job site.

Then, the microcomputer 10 stores the received maintenance program in the non-volatile memory 18 (S10).

The microcomputer 10 determines whether or not the device to be maintained 4 is connected (S11).

If the device to be maintained 4 is not connected (S11: NO), the microcomputer 10 waits until the device to be maintained 4 is connected.

If the device to be maintained 4 is connected (S11 YES), the microcomputer 10 supplies the maintenance program stored in the non-volatile memory 18 to the device to be maintained 4 (S12).

Thereafter, the microcomputer 10 ends the communication with the server apparatus 2 (S13), and ends the maintenance process.

Thereby, the portable telephone 1 connected to the device to be maintained 4 can be used as an external storage medium storing the maintenance program.

When the board 41 provided for the device to be maintained 4 is replaced, the processing program is supplied from the portable telephone 1 to the software unit 43 of the board 41, whereby the board 41 can be normally operated.

If there is nonconformity in the processing program incorporated into the software unit 43 of the board 41, the update program can be supplied from the portable telephone 1 to the software unit 43 to modify the nonconformity.

On the other hand, at S3, if the operation 1 or operation 2 is not selected (S3: NO), the microcomputer 10 determines whether or not the operation 3 is selected on the menu screen (S14).

If the operation 3 is not selected on the menu screen (S14: NO), the microcomputer 10 returns the control to S3.

If the operation 3 is selected on the menu screen (S14: YES), the microcomputer 10 displays a registration/change screen (not shown) (S15).

On the registration/change screen, the serial number of the device to be maintained 4, the image data of the installed site of the device to be maintained 4 or other necessary data is inputted.

The microcomputer 10 transmits each data inputted on the registration/change screen as registration data to the server apparatus 2 (S16).

Thereby, the management data of the device to be maintained 4 is registered or changed on the server apparatus 2.

Thereafter, the microcomputer 10 transfers the control to S13 to end the communication with the server apparatus 2 (S13), and ends the maintenance process.

In the maintenance process of FIG. 6, the connection of the device to be maintained 4 is confirmed at S11, but the connection may be confirmed at the time of starting the maintenance process, or the maintenance process may not be started until the connection is confirmed.

Also when the connection of the device to be maintained 4 is confirmed the supply of the maintenance program is started, but the supply may be started upon an operation of the maintenance person.

Figure 7:
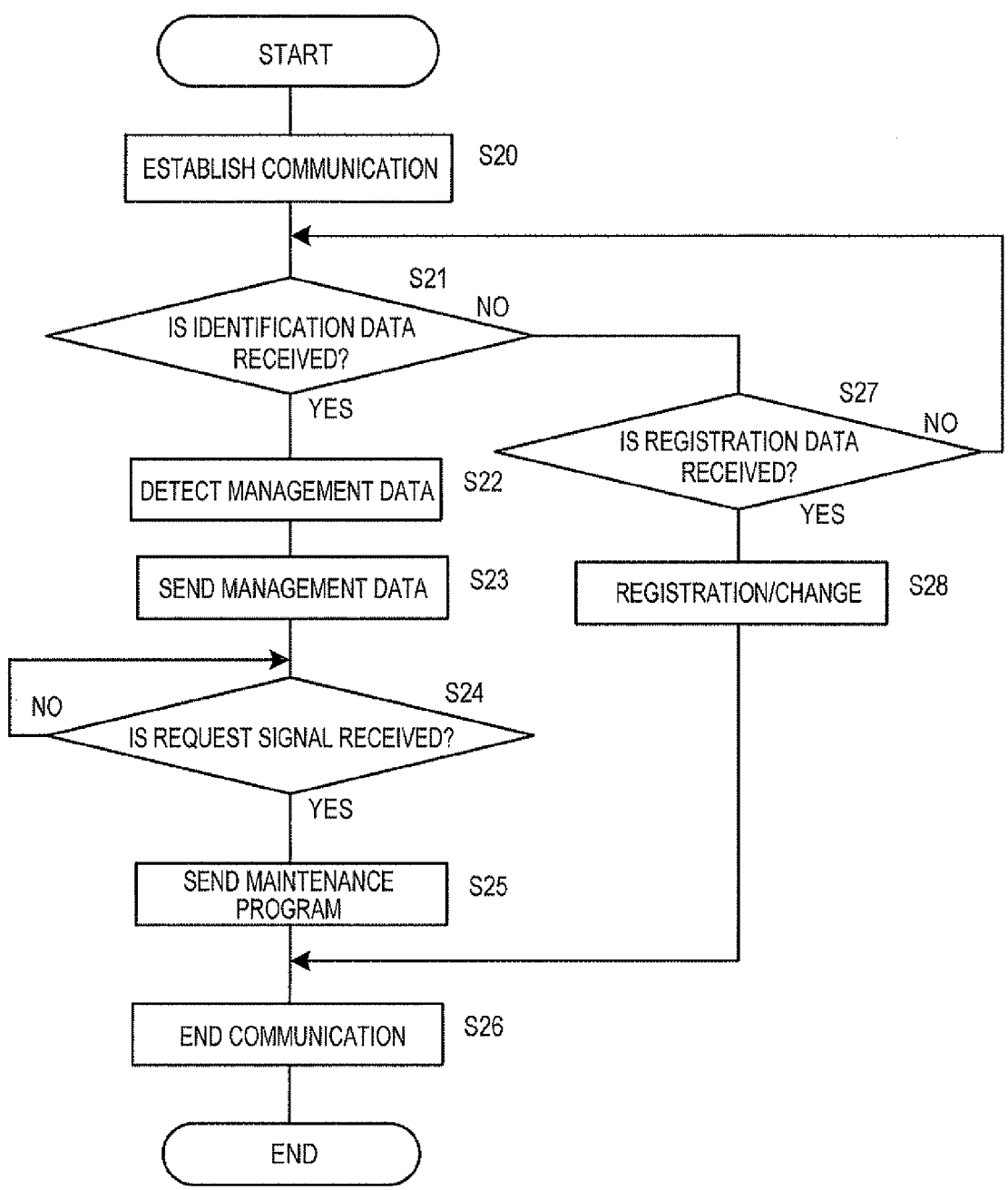
FIG. 7 illustrates a data maintenance process performed by the server apparatus.

Referring to FIG. 7, the operation of the server apparatus 2 in the maintenance system will be described below.

FIG. 7 illustrates a data maintenance process performed by the server apparatus 2.

First of all the control unit 20 of the server apparatus 2 establishes the communication with the portable telephone 1 (S20), and determines whether or not the identification data may be received from the portable telephone 1 (S21).

If the identification data may be received (S21: YES), the control unit 20 detects the management data including the identification data, based on the management data table of FIG. 3, for example (S22).

The control unit 20 transmits the detected management data to the portable telephone 1 (S23).

In this case, if the management data including the identification data cannot be detected, the registration process for newly registering the management data may be performed, or an error may be reported to the portable telephone 1.

Then, the control unit 20 determines whether or not a request signal may be received from the portable telephone 1 (S24).

As described above, the request signal is transmitted from the portable telephone 1, if the receivable maintenance program displayed on the displayed information screen is selected in the portable telephone 1.

If the request signal is not received from the portable telephone 1 (S24: NO), the control unit 20 repeats S24.

If the request signal may be received (S24: YES), the control unit 20 transmits the maintenance program based on the request signal to the portable telephone 1 (S25).

For example, if the request signal requests the processing program, the processing program is acquired from the address that is obtained by referring to the address of the processing program stored in the table of FIG. 3, and transmits it to the portable telephone 1.

The control unit 20 ends the communication with the portable telephone 1 (S26), and ends the data management process.

On the other hand, at S21, if the identification data is not received (S21: NO), the control unit 20 determines whether or not the registration data may be received from the portable telephone 1 (S27).

If the registration data is not received (S27: NO), the control unit 20 transfers the control to S21.

If the registration data may be received (S27: YES), the control unit 20 newly registers the management data of the device to be maintained 4 or changes the already registered device information, based on the registration data (S28), and transfers the control to S26.

The control unit 20 ends the communication with the portable telephone 1 (S26), and ends the data management process.

Next, a procedure with which the maintenance person performs the maintenance operation in the maintenance system comprising the portable telephone 1 and the server apparatus 2 that operate as described above will be described below.

Figure 8:
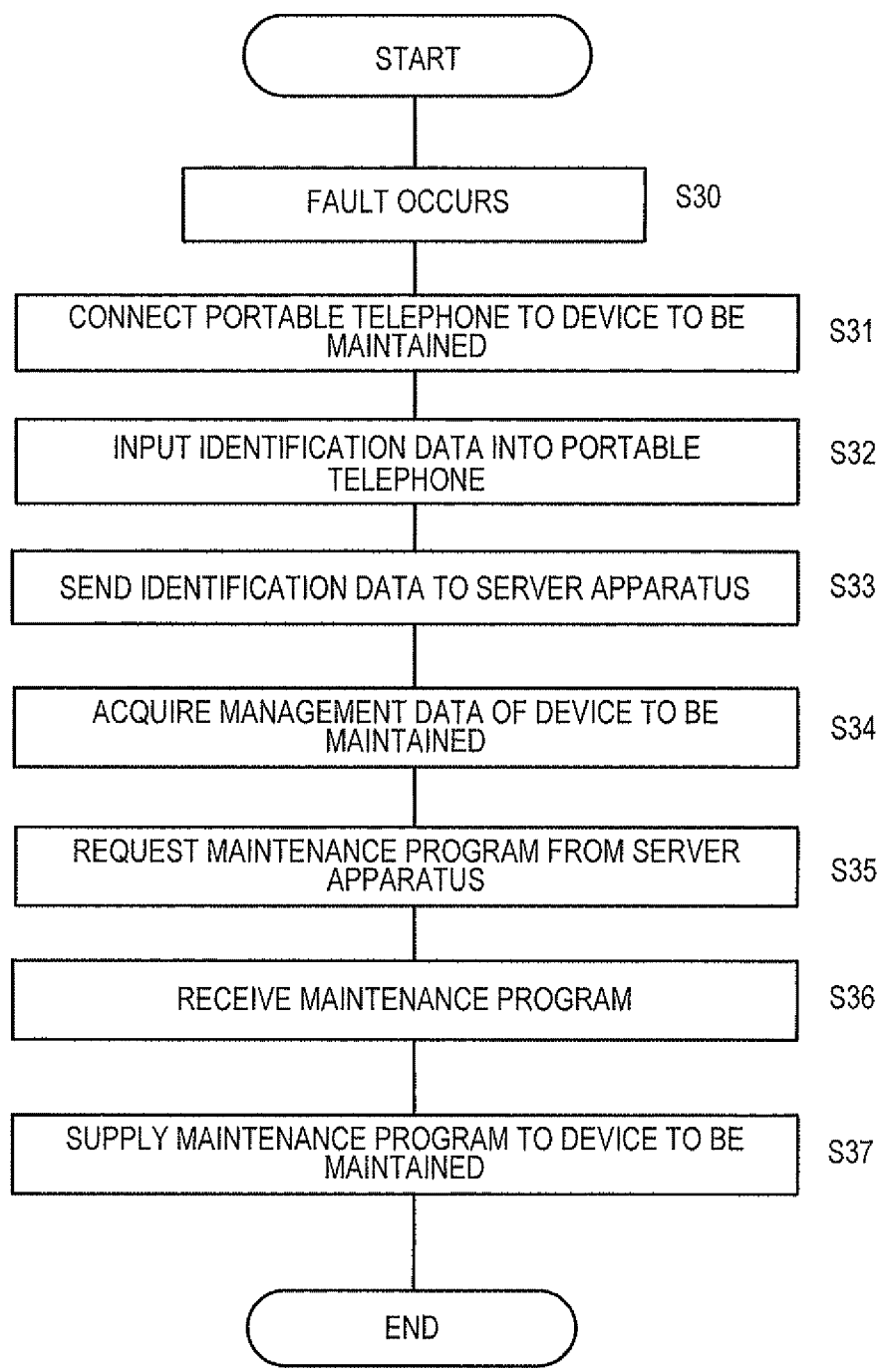
FIG. 8 illustrates a procedure for making the maintenance operation.

FIG. 8 illustrates a procedure for making the maintenance operation.

If a fault occurs in the device to be maintained 4 (S30), the maintenance person replaces the board 41 of the device to be maintained 4, for example, and connects the portable telephone 1 to the device to be maintained 4 (S31).

The maintenance application program is executed, and the identification data of the device to be maintained 4 is inputted into the portable telephone 1 in accordance with the menu screen as shown in FIG. 4A (S32).

The maintenance person transmits the identification data inputted into the portable telephone 1 to the server apparatus 2 (S33).

The management data of the device to be maintained 4 including the identification data transmitted from the portable telephone 1 is acquired on the portable telephone 1 (S34).

Then, the maintenance person requests the maintenance program required for the server apparatus 2 from the portable telephone 1 in accordance with the information screen of FIG. 5 displayed on the acquired management data (S35), and receives the maintenance program requested on the portable telephone 1 from the server apparatus 2 (S36).

The received maintenance program is supplied from the portable telephone 1 to the device to be maintained 4 (S37).

As described above, the maintenance system of this embodiment transmits the identification data (serial number) specifying the device to be maintained 4 from the portable telephone 1 to the server apparatus 2 with which the maintenance program required for maintenance of the device to be maintained 4 is registered.

The maintenance program including the transmitted identification data may be received by the portable telephone 1 and stored in the portable telephone 1.

Thereafter the stored maintenance program is supplied to the device to be maintained 4 connected to the portable telephone 1.

Thereby, the maintenance person can acquire the necessary maintenance program with the portable telephone 1 at a job site, even when repairing to the installed site of the device to be maintained 4 without bringing the necessary maintenance program.

Also, since the necessary maintenance program can be received based on the identification data, it is possible to eliminate such a human error that the maintenance person performs the maintenance process for the device to be maintained 4 with another maintenance program by mistake.

Figure 9:
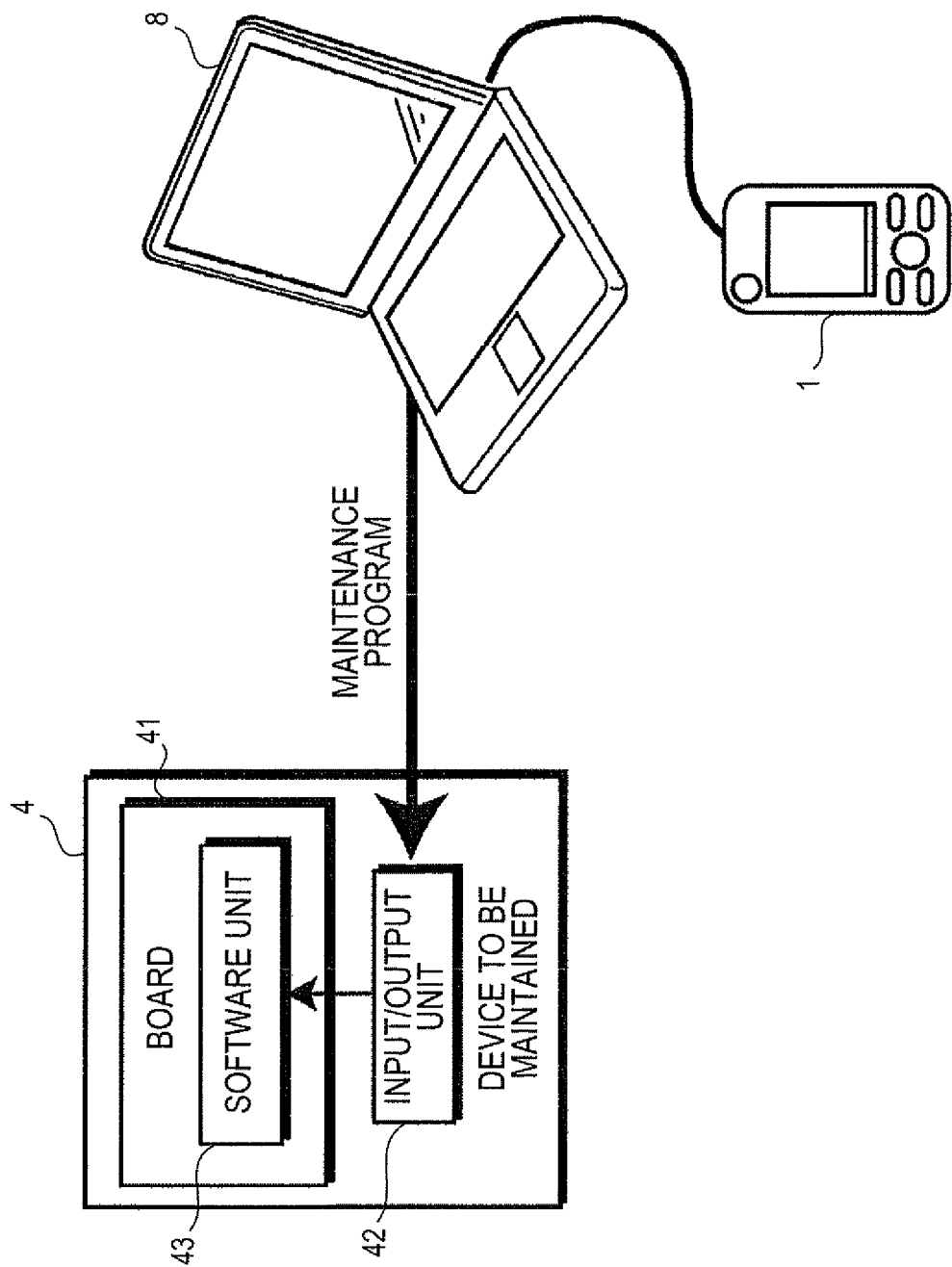
FIG. 9 illustrates an example of connecting the device to be maintained to the portable telephone via another apparatus.

FIG. 9 illustrates an example of connecting the device to be maintained 4 to the portable telephone 1 via another apparatus.

Though in this embodiment, the portable telephone 1 making up the maintenance system is directly connected to the device to be maintained 4, if the device to be maintained 4 is the type that can not directly connect the portable telephone 1, the portable telephone 1 may be connected by wire or wireless to a personal computer (hereinafter referred to as a PC) 8 and connected via the personal computer 8 to the device to be maintained 4, for example, as shown in FIG. 9.

In this case, the maintenance person may input the identification data from the personal computer 8, transmit it to the server apparatus 2, using a communication function of the portable telephone 1, and store the maintenance program received from the server apparatus 2 in the portable telephone 1.

The management data transmitted from the server apparatus 2 to the portable telephone 1 may include other data and may be transferred to any other external apparatus than the device to be maintained 4.

FIG. 10 illustrates an example of using an electronic paper apparatus.

The electronic paper apparatus 9 can make the wireless communication with the portable telephone 1 and store the received data in erasable manner, and has a display screen 9a for displaying the stored data.

And when the management data contains manual data of the device to be maintained 4, for example, the maintenance person can transfer the manual data contained in the management data received by the portable telephone 1 to the electronic paper apparatus 9 to confirm the manual on the electronic paper apparatus 9.

In this case, since the necessary manual can be acquired and confirmed at a job site, when the manual is confidential information, for example, the maintenance person does not need to take out the paper on which the manual is printed, thereby preventing leakage of the confidential information due to loss or robbery.

Though in this embodiment, the identification data of the device to be maintained 4 is the serial number, the identification data may be positional data of the installed site of the device to be maintained 4.

For example, image data of the installed site obtained as a result of imaging the installed site with the CCD camera 13 of the portable telephone 1 may be the identification data specifying the device to be maintained 4.

In this case, a template matching process for detecting the image data similar to the image data transmitted from the portable telephone 1 from the mass storage unit 21 of the server apparatus 2 is performed at S22 in the flowchart of FIG. 7, and as a result of the process, the image data of which the degree of similarity is a reference value or more is decided from the mass storage unit 21 to detect the management data set in the image data.

Thereby, the maintenance person can acquire the necessary management data by imaging the installed site with the CCD camera 13, even when not knowing the serial number.

Also, when the identification data is positional data of the installed site of the device to be maintained 4, the positional data may be acquired by the portable telephone 1 with a GPS (Global Positioning System).

The identification data of the device to be maintained 4 may be a MAC (Media Access Control) address or manufacturers serial number, besides the serial number or the positional data of the installed site.

This identification data may be automatically acquired from the device to be maintained 4, when the portable telephone 1 is connected to the device to be maintained 4.

Further, though the maintenance program is supplied from the portable telephone 1 to the board 41 of the device to be maintained 4 in the maintenance operation in this embodiment, the device to be maintained 4 may be the device in which an OS (Operating System) is operable and the setting data of the OS may be supplied from the portable telephone 1 in the maintenance system.

The setting data of the device to be maintained 4 may be backed up in advance in the server apparatus 2, and the backup data may be supplied via the portable telephone 1 to the device to be maintained 4.

Though one preferred embodiment of the invention has been specifically described above, each configuration and operation may be appropriately changeable, and not be limited to the above embodiment.

According to an aspect of an embodiment, the maintenance person can acquire the maintenance data required for the maintenance by transmitting the identification information of the device to be maintained in performing the maintenance operation at the installed site of the device to be maintained.

Accordingly, the maintenance person can acquire the necessary maintenance data with the communication apparatus at the job site, even when repairing to the installed site of the device to be maintained without bringing the necessary data.

Also, it is possible to eliminate such a human error that the maintenance person performs the maintenance process for the device to be maintained with another maintenance data by mistake.

Also, according to an aspect of an embodiment, the device to be maintained is specified with the intrinsic identification number, reducing such a human error that the maintenance data regarding the irrelevant device to be maintained is acquired.

Further, according to an aspect of an embodiment, the maintenance person can acquire the maintenance data regarding the device to be maintained with the positional information of the device to be maintained installed, even when he cannot grasp the kind of device to be maintained.

Also, according to an aspect of an embodiment, the maintenance person can acquire the maintenance data regarding the device to be maintained by imaging the installed site of the device to be maintained, even when he cannot grasp the kind of device to be maintained.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

The many features and advantages of the embodiments are apparent from the detailed specification and, thus, it is intended by the appended claims to cover all such features and advantages of the embodiments that fail within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A communication apparatus comprising:
   a memory; and
   a processor coupled to the memory and configured to:
   acquire identification information for identifying a device to be maintained;
   send the identification information to a server;
   receive a maintenance program that is installed by the device, and an image of a place identified by positional information corresponding to the identification information, the maintenance program corresponding to the identification information, and the positional information indicating the place at which the device is installed,
   display the image of the place on a display of the communication apparatus, and
   supply the maintenance program to the device.

2. The communication apparatus according to claim 1, wherein the identification information includes an intrinsic identification number assigned to the device to be maintained, and
   the maintenance program corresponding to the identification number included in the identification information is received.

3. The communication apparatus according to claim 1, further comprising:
   an imaging device configured to capture another image of the place, and
   wherein the processor is further configured to send the other image to the server as the identification information and receive the maintenance program that corresponds to the image matching the other image.

4. A maintenance system comprising a communication apparatus and a data providing apparatus that can make the data communication with each other via a network, the communication apparatus receiving a maintenance program required for maintaining a device to be maintained from the data providing apparatus, and supplying the maintenance program to a device to be maintained connected to be able to make the data communication, comprising:
   the communication apparatus comprising:
   a first memory; and a first processor coupled to the first memory and configured to:
acquire identification information for identifying a device to be maintained; and
send the identification information to a server;
the data providing apparatus comprising:
a second memory; and
a second processor coupled to the second memory and configured to:
store a maintenance program that is installed by the device in a storage;
receive the identification information sent by the communication apparatus;
detect the maintenance program including the identification information from data stored in the storage; and
send the maintenance program to the communication apparatus; and
the communication apparatus further configured to:
receive the maintenance program sent by the data providing apparatus, and an image of a place identified by positional information corresponding to the identification information, the maintenance program corresponding to the identification information,
maintenance program corresponding to the identification information, and the positional information indicating the place at which the device is installed;
display the image of the place on a display of the communication apparatus; and
supply the maintenance program to the device to be maintained.

5. The maintenance system according to claim 4, wherein the identification information includes an intrinsic identification number assigned to the device to be maintained,
the maintenance program of the device to be maintained, to which the intrinsic identification number is assigned, is stored in association with the intrinsic identification number, and
the maintenance program corresponding to the identification information included in the identification information is detected from data stored in the storage.

6. The maintenance system according to claim 4, further comprising:
an imaging device configured to
capture another image of the place, and
wherein the processor is further configured to send the other image
to the server as the identification information and receive the maintenance program that corresponds to the image matching the other image.

7. A method for maintaining a device to be maintained by supplying maintenance program required for maintenance of the device to be maintained stored in a data providing apparatus from the data providing apparatus to the device to be maintained via a communication apparatus, the method comprising:
acquiring identification information for identifying a device to be maintained;
sending the identification information to a server;
receiving a maintenance program that is installed by the device, and an image of a place identified by positional information corresponding to the identification information, the maintenance program corresponding to the identification information, and the positional information indicating the place at which the device is installed,
displaying the image of the place on a display of the communication apparatus, and
supplying the maintenance program to the device.

8. A non-transitory computer readable recording medium storing a computer program for enabling a computer to receive maintenance program required for maintenance of a device to be maintained and supply the maintenance program to the device to be maintained connected to be able to make the data communication, the program causing the computer to execute a method comprising:
acquiring identification information for identifying a device to be maintained;
sending the identification information to a server;
receiving a maintenance program that is installed by the device, and an image of a place identified by positional information corresponding to the identification information, the maintenance program corresponding to the identification information, and the positional information indicating the place at which the device is installed,
displaying the image of the place on a display of the communication apparatus, and
supplying the maintenance program to the device.

9. A method for performing maintenance comprising:
acquiring identification information with a communication apparatus for identifying a server;
sending the acquired identification information from the communication apparatus to a data providing apparatus;
outputting a maintenance program stored in the data providing apparatus that is installed by the device, and an image of a place identified by positional information corresponding to the identification information, the maintenance program corresponding to the identification information, and the positional information indicating the place at which the device is installed;
displaying the image of the place on a display of the communication apparatus, and
supplying the maintenance program to the device.

* * * * *

UNITED STATES PATENT AND TRADEMARK OFFICE
CERTIFICATE OF CORRECTION

PATENT NO.        : 8,693,999 B2  
APPLICATION NO.   : 12/236096  
DATED             : April 8, 2014  
INVENTOR(S)       : Niimi et al.

Page 1 of 1

It is certified that error appears in the above-identified patent and that said Letters Patent is hereby corrected as shown below:

In the Claims

Column 13, Line 24, In Claim 4, before "maintenance" insert -- the --.

Signed and Sealed this
Twenty-second Day of July, 2014

Michelle K. Lee
*Deputy Director of the United States Patent and Trademark Office*